(12) United States Patent
Lassalle

(10) Patent No.: US 7,882,109 B2
(45) Date of Patent: Feb. 1, 2011

(54) COMPUTER REPRESENTATION OF A DATA TREE STRUCTURE AND THE ASSOCIATED ENCODING/DECODING METHODS

(75) Inventor: Edmond Lassalle, Lannion (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/505,483

(22) PCT Filed: Feb. 21, 2003

(86) PCT No.: PCT/FR03/00576

§ 371 (c)(1),
(2), (4) Date: Feb. 23, 2005

(87) PCT Pub. No.: WO03/073320

PCT Pub. Date: Sep. 4, 2003

(65) Prior Publication Data

US 2005/0149471 A1    Jul. 7, 2005

(30) Foreign Application Priority Data

Feb. 27, 2002  (FR)  .................................. 02 02664

(51) Int. Cl.
*G06F 7/00* (2006.01)
*G06F 17/30* (2006.01)

(52) U.S. Cl. .................. 707/741; 707/797; 707/830
(58) Field of Classification Search .................. 707/100, 707/101, 102, 200, 741, 797, 830
See application file for complete search history.

(56) References Cited

U.S. PATENT DOCUMENTS

| 5,752,243 | A | * | 5/1998 | Reiter et al. .................... 707/3 |
| 6,009,434 | A | * | 12/1999 | Chui et al. .................. 707/100 |
| 6,701,467 | B1 | * | 3/2004 | Victor ........................ 714/701 |
| 6,813,611 | B1 | * | 11/2004 | Herzberg et al. .............. 705/30 |
| 7,002,494 | B2 | * | 2/2006 | Singhal et al. ................ 341/79 |
| 2006/0088836 | A1 | * | 4/2006 | Wohlgemuth et al. .......... 435/6 |

OTHER PUBLICATIONS

Chen et al, "Parallel Breadth-first and Breadth-depth traversals of general trees", 1990, Springer Berlin / Heidelberg, vol. 468/1990, pp. 395-404.*

H. Chang, Bubble Structure and Operation to Facilitate Tree Traversal, IBM Corp. vol. 26, No. 9, Feb. 1984, pp. 4766-4777.

(Continued)

*Primary Examiner*—Apu M Mofiz
*Assistant Examiner*—Jared M Bibbee
(74) *Attorney, Agent, or Firm*—David D. Brush; Westman, Champlin & Kelly, P.A.

(57) ABSTRACT

A memory storing a computerized data array in the form of a table of values stored in the memory as a directed tree representing a set of data. Each data entry in the set is associated with a particular node of the tree, the values representing node ranks of the tree. The node ranks are ordered according to a first total order relation, the values being stored at addresses in the memory representing the node ranks and being ordered according to a second total order relation.

6 Claims, 4 Drawing Sheets

OTHER PUBLICATIONS

Stephen W. Lam et al., Representing Lexicons by Modified Trie for Fast Partial String Matching, SPIE, vol. 1906, Character Recognition Technologies, 1993, pp. 229-237.

John A. Dundas III, Implementing Dynamic Minimal-Prefix Tries, Software Practice and Experience Oct. 21, 1991, No. 10, Chichester, Sussex, GB, pp. 1027-1040.

International Search Report, dated Dec. 2, 2003 for corresponding International Application No. PCT/FR2003/000576, filed Feb. 21, 2003.

Preliminary Examination Report, dated Oct. 6, 2004 for corresponding International Application No. PCT/FR2003/000576.

* cited by examiner

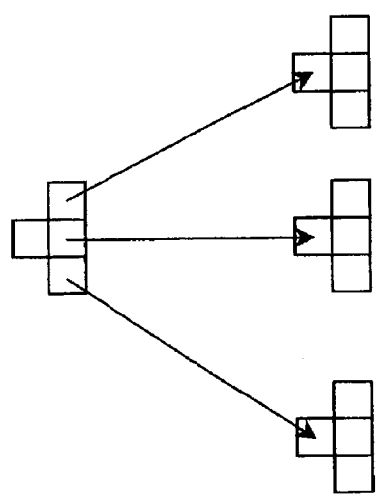
Fig. 2A
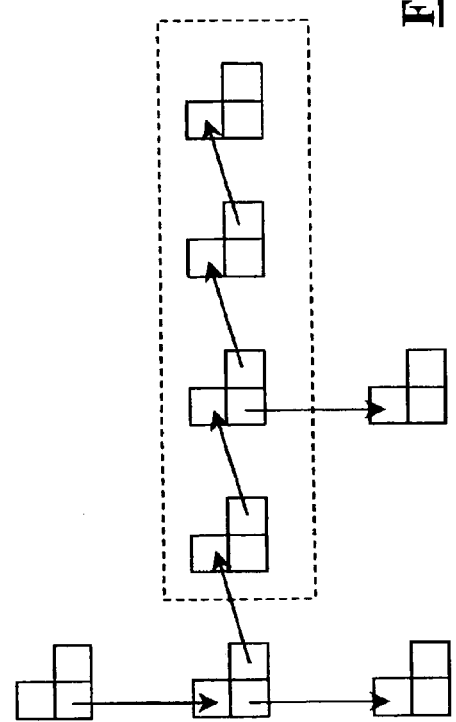
Fig. 2B
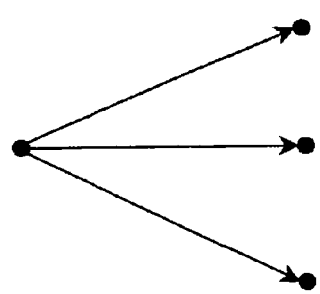
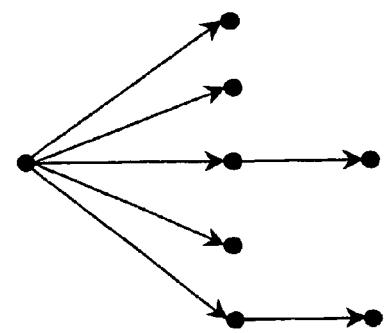

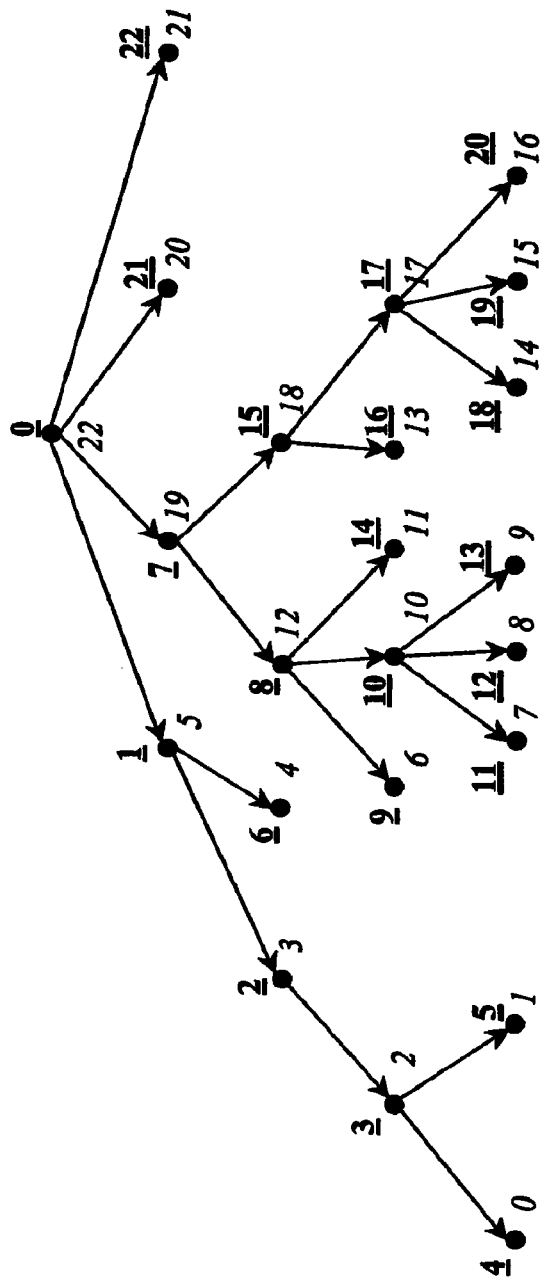

COMPUTER REPRESENTATION OF A DATA TREE STRUCTURE AND THE ASSOCIATED ENCODING/DECODING METHODS

CROSS-REFERENCE TO RELATED APPLICATIONS

This is a U.S. National Phase and claims the benefit of the filing date of PCT/FR03/000576, filed Feb. 21, 2003, and also claims the benefit of priority under 35 U.S.C. §119 of French Application No. 02/02664, filed Feb. 27, 2002, the entire disclosures of which are hereby herein incorporated by reference.

The present invention relates to a computerized data array of a directed tree showing the organization of a set of data, in particular a dictionary. The present invention also concerns a method of encoding said directed tree in said computerized data array. Moreover said invention also concerns a method of encoding a data entry belonging to said data set into an index of said data array. Lastly the present invention relates to a decoding method allowing retrieving said corresponding data on the basis of said computerized data array.

A number of terms used herebelow will now be defined before discussing the state of the art:

A directed graph (hereafter simplified to just "graph") denotes a pair G=(S, A), where S is a set of tops (hereafter also termed "nodes"), and A is a sub-set of S×S which is called "set of arcs".

A path in the graph is an ordered sequence $(s_o, s_1, \ldots s_n)$ of tops such that $(s_{i-1}, s_i)$ is an arc for $l=1 \ldots n$. When $s_n = s_o$ where $n \geq 1$, the path is called a "circuit" or a "cycle". A graph is called "convex" if two arbitrary nodes of this graph are linked by one path.

A tree is defined as a non-circuit related graph. It may be shown that two arbitrary tops of a tree are linked by a unique path. A tree comprises a particular top R such that any top s different from R is linked to latter by a path. This particular top is called the tree's "root".

For a given top S, the descendant of S is any top $s_d$ of the tree such that there is a path. between s and $s_d$. Conversely, for a given top s, the ancestor of s is any top $S_a$ of the tree such that there is a path between $S_a$ and s. "Offspring of a top" of a top S is a descendant $s_f$ of s such that $(S, s_f) \in A$. For any top s of the tree, the subtree of s is the tree of root s comprising all the descendants of s.

Lastly a "leaf" is any tree top lacking a descendant.

Many data processing procedures resort to a tree-shaped data array, in particular procedures to classify, compress or store information.

As regards the application under consideration, the data may be character chains, sequences of phonemes, waveshape, luminance/chrominance patterns etc.

Without prejudice to generality, herebelow the data shall be constituted by chains of elementary entities or characters (for instance letters, ideograms, numerals, alphanumeric signs). The set of these possible characters constitutes an alphabet. It is assumed herein that said alphabet comprises a total order relation called "alphabetic order".

As regards many applications such as "search engines", "search a dictionary", "search a phone book": etc., a very large volume of data must be stored and be accessible, entailing severe constraints in actual operating conditions, in particular as regards on-line access.

All data must be quickly accessible without requiring large computational power. Moreover, in order to reduce accessing time, large data volumes must remain in the central memory. To preclude the size of this memory from growing excessively large, frequently the data must be compressed beforehand. Advantageously the data should be accessible without requiring being decompressed, whereby accessing time would be degraded further.

As regards the above applications, the data may be processed asymmetrically: the data compression stage may include comparatively lengthy and complex processing whereas their accessing retrieval stage must be simple and fast. Accordingly the data may be stored in memory in frozen and compressed form, their updating taking place off-line before they will be moved back online.

One data organizing geometry is especially well suited for compression, namely that of the above defined tree. This geometry is present in particular in dictionaries or phone books. In the common sense of the word, a dictionary is a data file (also called inputs), each data consisting of a chain of alphabetic characters, and said chains being organized in a tree geometry.

In practice and in a computerized data array, all dictionary data is associated with an index. The search for a chain of characters (or word) in the dictionary amounts to identifying the index of the corresponding word. Accordingly a text may be represented by a sequence of indices which is better fitted to data processing than the initial representation.

Various kinds of representations or arrays have been proposed in the prior art, in particular:

in the form of a dichotomy Table using a Ziv-Lempel compression, in the form of a hash Table, in the form of a lexical tree.

In case of perfect access, those different sorts of representation offer equivalent performances. "Perfect access" is an accessing mode to search the precise chain of characters in the dictionary that corresponds to the word to be analyzed, neglecting errors or modifications.

A data array in the form of a lexical tree assumes analysis of, i.e. parsing, the chains of characters. FIG. 1 shows an illustrative lexical tree for the following Δ dictionary, Δ={abolish, abolition, appeal, attorney, bar, barrister, bench, case, court, crime}.

Be it borne in mind that in the lexical tree, the arcs are associated to the characters of the dictionary's words. More specifically, a tag is associated with each tree arc, each tag being fitted with a character acting as a tag. The lexical tree is the junction of all the paths of which the skeleton corresponds to one word in the dictionary. The "skeleton" of a path is the chain of characters of the arc tags constituting this path. A dictionary word also is called dictionary "input".

Be it noted furthermore that the leaves of the lexical tree are represented by circles, whereas the other tops were shown by disks. The tree root is denoted by R.

The tree is assumed indexed, that is, one index is associated with each top. One elementary operation on a lexical tree is to search for the corresponding dictionary input index on the basis of a given word. This operation entails traversing the tree along the arcs tagged by the consecutive characters composing the word.

More specifically, the search algorithm implements an AnalyzeWord function which returns the index as the value [associated-index (s)] of the dictionary input if latter is present, or, by default, a code of non-identification {unknown-word-index}. Hereafter said value is expressed in pseudo-code C:

```
Function IndexNumber AnalyzeWord (chain AnalyzeWord, top Root)
Begin
    top s = Root,
    For each Character of AnalyzeWord:, Carry out
        If end-of-word (AnalyzeWord) and s is a leaf
            Then return associated-index (s);
        If Character corresponds to a tag of an arc issuing from s
            Then s = corresponding-descendant(s);
        Otherwise return Unknown-Word-Index;
End.
```

Traversing by the instructions s=corresponding-descendant(s) assumes that a computerized data array of the lexical tree is available.

In general, a computerized data array of a tree will be required to easily traverse the tree, to use it and to modify it.

As regards a first known computerized data array, a tree is represented by an adjacency Table $M=(m_{ij})$, where $l=0, \ldots, n; j=0, \ldots, n$, said Table being stored in memory and where $m_{ij}=1$ when $(s_i, s_j) \in A$.

As regards a more recent computerized data array, a tree is shown as a sequence of pointers. In a first known variation illustrated in FIG. 2A, each node is represented by a value (or index) and a Table of pointers pointing to its offspring nodes. The size of the Table corresponds to the maximum number (k) of offspring that a tree node may have (in which case it is called a k-tree). FIG. 2A illustrates a 3-tree in this variation.

Encoding the node offspring by a Table of pointers entails the drawback of demanding much memory space already when the tree contains only a small number of nodes exhibiting many offspring and many other nodes having few offspring. In a second known array variant, this difficulty is remedied by using, for a given node, a pointer pointing toward one of its offspring nodes which is called the elder offspring and a pointer from the elder offspring toward a chained list of its siblings. FIG. 2B illustrates such a second variant representation for a 5-tree.

The pointers allow rapidly modifying the tree geometry but on the other hand they require a relatively substantially large memory. Moreover detecting descendance between nodes is not immediate. Such detection presumes ascertaining the path linking the two nodes, whereby, within the scope of pointer representation, considerably computing resources are required. Computation may be substantially reduced by storing the transitive tree closing, in which case a node will point toward each of its descendants. However this latter option occupies comparatively much memory space.

The basic objective of the present invention is to create a computerized data array of a tree that shall demand only little memory space and allows traversing said space easily and modifying it in simple manner.

This objective is attained by the tree computerized data array of the organization of a set of data, in particular of a data dictionary, each data being associated to a particular node of said tree, said representation comprising a Table of values which are stored in a memory, said values representing the ranks of the nodes of said tree which are ordered according to a first total order relation, the addresses at which said values are stored representing the ranks of the nodes of said tree that are ordered according to a second total order relation.

Advantageously the first total order relation is a combination of a descendance order relation ordering a node relative to its descendants and a primogeniture order relation ordering the offspring nodes of a given node.

In a first implementing mode of the present invention, a first tree node is lower than a second tree node according to first said total order relation if the second node is a descendant of the first node or if the common ancestor of the first and second nodes has a first offspring from which the first node descends or is merged with the latter and a second offspring from which the second node descends or is merged with the latter, said first offspring is lower than the second offspring according to the primogeniture order relation.

In a second implementing mode of the present invention, a first tree node is higher than a second tree node according to the first total order relation if the second node is a descendant of the first node or if the common ancestor of the first and second nodes has a first offspring from which s the first node descends or is merged with the latter and a second offspring from which s the second node descends or is merged with the latter, said first offspring is lower than said second offspring according to the primogeniture order relation.

Advantageously the second total order relation is a combination of the inverse ordering relation of said descendance order relation and said primogeniture order relation.

In a first variant of the present invention, a first tree node shall be lower than a second tree node according to said second total order relation if the first node is a descendant of the second node or if the common ancestor of the first and second nodes has a first offspring from which the first node descends or is merged with latter and a second offspring from which the second node descends or is merged with latter, then said first offspring is lower than the second offspring according to said primogeniture order relation.

In a second variant of the present invention, a first tree node is higher than a second tree node according to said second total order relation if the first node is a descendant of the second node or if the common ancestor of the first and second nodes has a first offspring from which the first node descends or is merged with the latter and a second offspring from which the second node descends or is merged with the latter, said first offspring is lower than the second offspring according to said primogeniture order relation.

If the data are character sequences of an alphabet comprising alphabetic ordering, each arc of said tree being associated with a character of at least one data entry, the primogeniture order relation between two offspring from the same node may be determined by the alphabetic order relation between the characters associated with the respective arcs between said node and its two offspring.

The present invention also relates to a method of encoding a directed tree representing the organization of a set of data, in particular a dictionary, each data entry of said set being associated to a particular node of said tree, where each node of said tree is assigned a first and a second index, the first index representing the node rank according to a first total order relation ordering the nodes of said tree, the second index representing the node rank according to a second total order relation, the first total order relation being a combination of a descendance order relation ordering a node relative to its descendants and of primogeniture order relation ordering the offspring nodes from the same node, the second total order relation being a combination of the inverse ordering relation of said descendance order relation and of said primogeniture order relation.

Advantageously the encoding method comprises recursive calculation stages revealing, for any arbitrary tree node, the size of the subtree issuing from said node.

As regards a first and a second offspring from the same node, called parent node, where said first and second offspring are adjacent in a list of offspring ordered according to said primogeniture order relation, the calculation stage will determine the first index of the second offspring on the basis of the first index of the first offspring and the size of the subtree issuing from the first offspring, and the second index of the second offspring on the basis of the second index of the first offspring and the size of the subtree issuing from the second offspring.

Said calculation stage determines the first index of the offspring that was ranked being first in said list based on the first index of said parent node and the second index of said parent node based on the second index of the offspring ranked last in said list.

Also said calculation stage determines the size of the subtree issuing from said parent node based on the sum of the sizes of the subtrees issuing from its offspring.

Advantageously said encoding method operates on a first array of said tree using pointers, in a manner that, for a given node, a first kind of pointer provides an offspring node according to the descendance order relation and a second kind of pointer provides the list of its other offspring.

The present invention also is defined by an encoding method of an input data entry belonging to a set of data which are organized according to a directed tree geometry, in particular to a data dictionary, said data consisting of sequences of characters of an alphabetically ordered alphabet, each data entry being associated with a given node of said tree, and to each arc being associated with a character, wherein said tree is represented by the above computerized data array, the tree being crossed from node to node along a path starting at the root, said input data entry being analyzed character by character, the node following an instantaneous node of said path being selected from among the offspring of said instantaneous node, the selection being implemented by a sequence of comparison stages each of which compares the instantaneous character of said input data entry with the character associated with the arc linking the instantaneous node to one of its offspring, the traversal being interrupted only after said input data entry has been fully analyzed, said method attaining the encoded value of said input data entry in the form of an index which relates the address of the Table of said computerized data array representing the last node of said path.

Moreover the present invention is defined by a method of decoding an index representing a data entry which belongs to a set of data arranged in a directed tree geometry, in particular a data dictionary, said data consisting of sequences of characters of an alphabetically ordered alphabet, each data entry being associated with a character, where said tree is represented by means of the above cited computerized data array, the tree being traversed along a path starting at the root, the node following an instantaneous node of said path being selected from among the offspring of the latter node, said selection being implemented by a sequence of comparison stages, each of which compares said index to an index that represents one of said offspring in said computerized data array, said method providing, as the decoded data, the chain of characters associated with the arcs constituting said path.

The above cited features of the present invention as well as others are elucidated in the description below of certain modes of implementation and relates to the appended drawings.

FIG. 2A shows a first computerized data array of a tree using pointers,

FIG. 2B shows a second computerized data array of a tree using pointers,

FIG. 3A illustrates a tree encoding method of a first embodiment of the invention, FIG. 3B shows a first variation of the computerized data array of the tree of the tree of FIG. 3A, FIG. 3C shows a second variation of the computerized data array of the tree of FIG. 3A.

Figure 1:
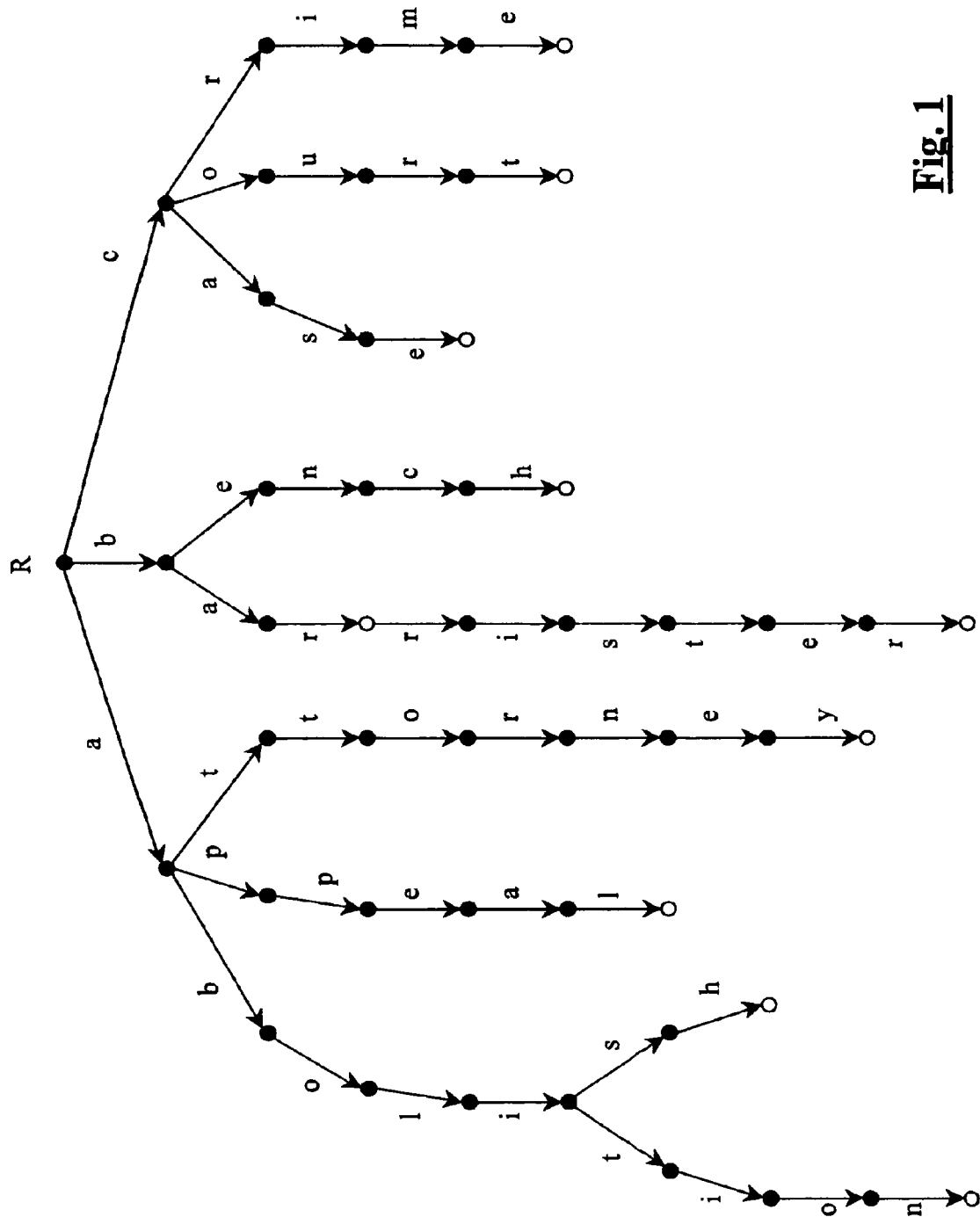
FIG. 1 shows an illustrative lexical tree.

The basic concept of the present invention is to create a novel computerized data array of a tree on the basis of a total order relation translating the dependency relations between the nodes.

The node interdependency relation entails a partial ordering relation affecting the group of tree nodes. Illustratively, assuming that for two tree nodes $s_1$ and $s_2$ there is $s_1 > s_2$ provided that $s_2$ be a descendant of $s_1$, then an ordering relation does exist. However this ordering is only partial because not all nodes of this tree may be compared in this manner (illustratively the offspring from the same node).

A total order relation may be constructed regarding the nodes of a tree provided it is known how to order the offspring from one node. The ordering in which to rank the offspring of the same node shall be called conventionally the primogeniture order. As regards a lexical tree of which the arc tags contain alphabetical characters, it may be agreed that two offspring $s_1$ and $s_2$ of one node S shall satisfy the relation $s_1 > s_2$ if the character of the tag associated with the arc $(S, s_1)$ precedes that of the tag associated with the arc $(S, s_2)$. Otherwise the alphabetic order of the reference label tags entails a primogeniture order on that offspring nodes from the same node.

The combination of the partial descendance order relation $$\left(\text{hereafter denoted as } \underset{D}{>} \text{ or } \underset{P}{>} \text{ or } \underset{D}{<} \underset{P}{<}\right)$$

with the primogeniture order relation (hereafter) allows attaining a total order relation for all the groups of nodes. This combination may be attained in several ways:

$$\underset{pref}{<}$$

prefix ordering relation (conventionally denoted by):

$$a \underset{ferp}{<} b \text{ if } a \underset{D}{<} b \text{ or } a' \underset{P}{<} b'$$

where a' and b' are the offspring of the common ancestor of a and b such that a is a descendant of or merges with a' and b is a descendant of or merges with b'.

In other words the node a is lower than the node b in the sense of prefix ordering if b is a descendant of a or a' is an older brother of b'.

$$\underset{ferp}{<}$$

inverse prefix ordering relation (conventionally denoted)

$$b \underset{perf}{<} b \text{ if } a \underset{D}{<} b \text{ or } a' \underset{P}{<} b'$$

$$\underset{post}{<}$$

inverse postfix ordering relation (conventionally denoted by):

$$a \underset{post}{<} b \text{ if } a \underset{D}{<} b \text{ or } a' \underset{P}{<} b'$$

In other words the node a is lower than the node b in the sense of postfix ordering is a descendant of b or a' is an older brother of b'.

$$\underset{tsop}{<}$$

inverse postfix ordering relation (conventionally denoted):

$$b \underset{tsop}{<} a \text{ if } a \underset{D}{<} b \text{ or } a' \underset{P}{<} b'$$

Because two arbitrary tree nodes are either descended from each other or descended from a common ancestor, the above defined ordering relations are total ordering relations.

$$\underset{pref}{<} \left(\text{or } \underset{ferp}{<}\right) \text{ and } \underset{post}{<} \left(\text{or } \underset{tsop}{<}\right)$$

The order relations therefore allow entirely ordering the totality S of the tree's nodes. In other words, a "ranking" function of S in [0,n] may be associated with each of the order relations, for instance:

PrefixRank: S⇒[0,n]

$$s_1 \underset{pref}{<} s_2$$

such that if and only if PrefixRank($s_1$)<PrefixRank($s_2$)

PostfixRank: S⇒[0,n]

$$s \underset{post}{<} s_2$$

$$\underset{ferp}{<} \text{ and } \underset{tsop}{<}:$$

such that if and only if PostfixRank($s_1$)<PostfixRank($s_2$).

PrefixRank and PostfixRank are ordered group morphisms. Ranking functions InversePrefixRank and InversePostfixRank may be defined in the same manner using the ordering relations InversePostfixRank: S⇒[0,n]

$$s_1 \underset{ferp}{<} s_2$$

such that if and only if InversePrefixRank($s_1$)<InversePostfixRank($s_2$)

InversePostfixRank: S⇒[0,n]

$$s_1 \underset{tsop}{<} s_2$$

such that if and only if InversePostfixRank($s_1$)<InversePostfixRank($s_2$).

In a first mode of implementation, a bijection T of [0,n] into [0,n] defined as follows is used to construct the computerized data array:

T: [0,n]⇒[0,n]

T=PostfixRank ○ Prefix$^{-1}$Rank.

The bijection $T^{-1}$ is used in a variation of this first embodiment mode.

In the same manner, composition-based bijections may be used:
InversePostfixRank ○ Prefix$^{-1}$Rank, PostfixRank ○ Inverse $^{-1}$PrefixRank or InversePostfixRank ○ Inverse $^{-1}$PrefixRank in other embodiment modes of the invention, or yet in variations of them, the inverses of these bijections.

For the sake of simplicity, the discussion of the present invention is restricted to using the bijections T and $T^{-1}$, it being understood that the other bijections are equally applicable.

Said bijection T may be computer represented in the form of a second Table of values in memory, the postfix rank of a node being stored at an address representing this node's prefix rank.

Similarly the bijection $T^{-1}$ may be a computerized data array in the form of a second Table of values stored in memory, the postfix rank of a node being stored at an address representing this node's prefix rank.

An illustration shall elucidate the significance and application of these bijections.

FIG. 3A illustrates a tree of which the nodes were indexed by the prefix ranks (bold and underlined) and by the postfix ranks (italics). The primogeniture order relation illustratively entailed by an alphabetic order on the tag labels in the case of a lexical tree is shown conventionally increasing from left to right. In this manner each node s is associated with a pair

[Prefix(s)Rank, Postfix(s)Rank.

These pairs advantageously are stored in a Table by means of the bijection T (FIG. 3B) or $T^{-1}$ (FIG. 3C). In FIG. 3B, the postfix rank values were stored at the addresses indicated by the corresponding prefix rank values. As regards the inverse, the prefix rank values were stored at the addresses indicated by the corresponding postfix rank values.

A first advantage of the tree's computerized data array of the invention is that it takes up only a memory space the size of the (n+1) tree as contrasted to a conventional pointer representation (FIGS. 2A and 2B) requiring at least twice that memory space.

A second and essential advantage of this computerized data array is to allow in very simple manner a dependency relation between two tree nodes: to determine whether a node $s_2$ depends on a node $s_1$. Illustratively no more is needed than to compare Prefix($s_1$)Rank with Prefix($s_2$)Rank on one hand and Postfix($s_1$) to Postfix($s_2$)Rank on th other:

$s_2$ depends on $s_1$ if and only if:

Prefix($s_2$)Rank>Prefix($s_1$)Rank and Postfix($s_2$)<Postfix($s_1$)Rank.

Accordingly, as regards FIG. 3A, one may see that the node represented by the pair (PrefixRank, PostfixRank)=(5, 1) does depend on that represented by the pair (PrefixRank, PostfixRank)=(1, 5) but not on that represented by the pair (PrefixRank, PostfixRank)=(22, 21).

In the same manner and using Table 3B, the descendants or ancestors of a given node are easily determined. For instance it is enough—in order to determine the list of descendants of the node (8, 12)—to analyze the Table in the direction of increasing addresses, starting with the address 8 and to search for those among the stored data that are lower than the postfix 12 (in this instance 6, 10, 11, 7, 8, 9). These values denote the postfix ranks of the particular node's descendants. To ascertain the list of ancestors of the node (8, 12), it will be enough to analyze the Table in the direction of the decreasing addresses, starting at the address 8 and to search among stored data for those which are larger than the postfix 12 (here 19, 22). These values denote the postfix ranks of the particular node's ancestors.

A dual procedure is used in the Table of FIG. 3C. Returning to the previous illustration, the list of descendants may be determined by merely analyzing the Table in the direction of decreasing addresses starting with address 12 and by searching among the stored data for those which are higher than the prefix 8 (here 14, 10, 13, 12, 11, 9). These values denote the prefix ranks of the particular node's descendants. Again, to ascertain the list of ancestors of (8, 12), it suffices to analyze the Table in the direction of increasing addresses, starting with address 12, and to search among the stored data for those less than the prefix 8 (here 7, 0).

A third advantage offered by the computerized data array of the invention is to allow easily traversing the tree, either from root toward the leaves—for instance when analyzing a chain of characters (word) using a lexical tree, or from the leaves toward the root, said traversal illustratively being carried out when generating a chain of characters from a node's index.

Traversing the tree from the root toward the leaves presumes the know-how to determine a given node's offspring. As will now be shown, the Table of FIG. 3B (or that of FIG. 3C), allows easily finding said offspring.

The Table of FIG. 3B is considered while presuming that the navigation algorithm searches the offspring of the node (12, 8). Starting from the address 8, the Table is analyzed in the direction of increasing addresses, In the same manner as above, the Table data less than 12 are searched for. When keeping a data entry x less than 12, the ensuing data which are less than x are no longer considered. In other words, the Table will be further analyzed until again a data entry x' larger than x is found (but still less than the initial value 12). This procedure is repeated till the end of the Table. Accordingly, in the present instance, first the value 6 is encountered, which is retained (<12), then the value 10 which also is retained (6<10<12). The following values 7, 8, 9 are not kept because, while being less than 12, on the other hand they fail to exceed the last retained value 10. Next the value 11 is retained (10<11<12), but the following values may not be because being larger than 12.

A dual approach is used in the Table of FIG. 3C. Using the previous embodiment, the Table is analyzed in the direction of decreasing addresses, beginning at the address 12. In the above manner, the stored data with a higher prefix than 8 are searched for. When a data entry x larger than 8 is encountered, the following data that are higher than x shall be ignored. In other words, the Table is analyzed further until again a data entry y less than x (but still higher than the initial value 8) shall be found. This procedure is iterated until reaching the beginning of the Table. Accordingly, in the present instance, first the value 14 is encountered, which is retained (>8), then the value 10, which is also retained (8<10<14). The following values 11, 12, 13 are ignored even though much higher than 8, because not being less than the last retained value 10. Next the value 9 is retained (8<9<10), however the ensuing values may not be because being less than 8.

This method of determining a given node's offspring is appropriate only for small trees. As shown further below, however, as regards larger trees, the prefix/postfix ranks of said offspring may be calculated more rapidly in a direct manner.

Be it borne in mind that if in lieu of the Tables constructed based on the bijections T and $T^{-1}$ they illustratively would have been constructed based on the bijections InversePostfixRank $\circ$ Prefix$^{-1}$Rank, PostfixRank $\circ$ InversePrefix$^{-1}$Rank or InversePostfixRank $\circ$ InversePrefix$^{-1}$Rank or also when based on the inverses of these bijections, the offsprings of a given node could have been determined in similar manner, though possibly at the tradeoff of changing the direction of analyzing and/or changing the direction of the inequalities.

Again the traversal through a tree from its leaves to its root presupposes possible determination of a given node's father. It is now assumed that the navigation algorithm searches for the father of the node (12, 8); first the Table of FIG. 3B shall be considered. Starting from the address 8, the Table is analyzed in the direction of the decreasing addresses. The first data entry encountered which is higher than 12 provides the postfix index of the father of the applicable node (here 19).

It is understood that a dual procedure is implemented in FIG. 3C. In this instance the Table is analyzed in the direction of increasing addresses, starting from the address 12. The first data entry being encountered that is less than 8 provides the prefix index of the father of the pertinent node (here 7).

To transform an arbitrary tree into its computerized data array, which is an operation termed "tree encoding", first there must be node indexing. To encode the tree in the form of a computerized data array of the present invention, the nodes must be indexed by means of the functions PrefixRank and PostfixRank (or other equivalent functions cited above). Without loss of generality, we shall restrict the exposition of the indexing method of the present invention to the two above functions.

The indexing method operates on a conventional computerized tree data array using pointers in the manner illustrated by FIG. 2B. This conventional data array is attained in known manner beginning with a file of the dictionary inputs. The vertical pointer chaining corresponds to an input relation of the inputs. The horizontal chaining of the siblings of one node takes place in the primogeniture order such as inherited by classifying the label tags.

The root's prefix rank is initialized to 0 and the tree is then traversed through from this root along the pointers from elder son until coming to leaf (the one most on the left according to the conventional mode of the selected array of this instance). The postfix rank of this leaf is initialized to 0.

Figure 4:
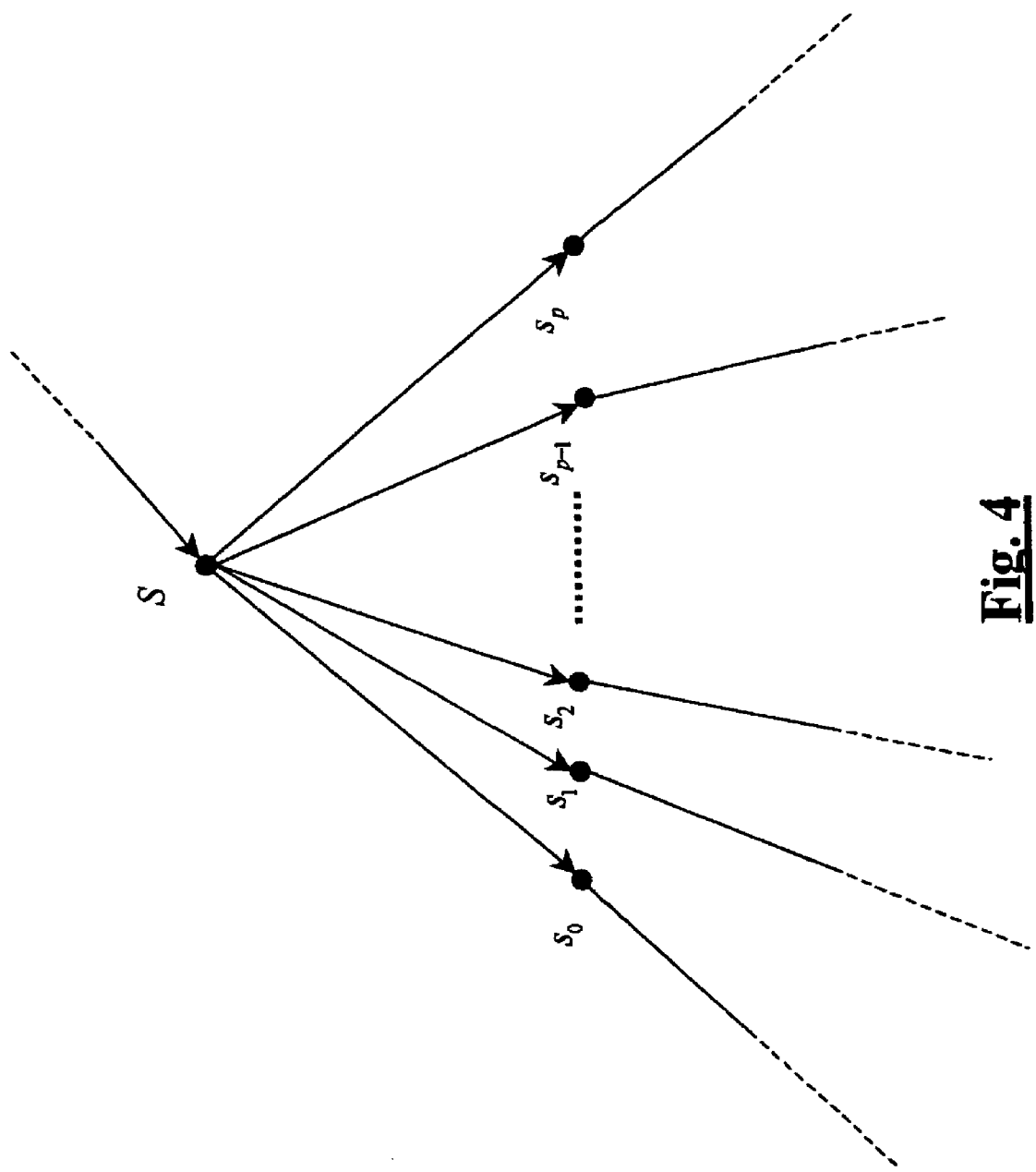
FIG. 4 illustrates a tree section before indexing by prefix rank and postfix rank.

Assume a node S of the tree having offspring $s_0, s_1 \ldots s_p$ which are arranged in increasing primogeniture order (that is, they are ordered in horizontal chaining), as illustrated in FIG. 4. The following relations ensue:

$$\text{Prefix}(s_2)\text{Rank} = \text{Prefix}(S)\text{Rank} + 1$$

$$\text{Prefix}(s_{i+1})\text{Rank} = \text{Postfix}(s_1)\text{Rank} + \Gamma(s_1)$$

$$\text{Postfix}(s_{i+1})\text{Rank} = \text{Postfix}(s_i) + \Gamma(s_{i+1})$$

$$\text{Postfix}(S)\text{Rank} = \text{Postfix}(s_p)\text{Rank} + 1$$

$$V(S) = \sum_{i=0}^{p} \Gamma(s_i) + 1$$

where $\Gamma(S)$ is the size of the subtree issuing from s.

Indexing by prefix rank and by postfix rank may be carried out in one pass from the tree root by recursively calling a function that, for a given top s returns the size $\Gamma(s)$ of the subtree issuing from said tree. This function is listed below in pseudo-code C:

```
Function size CodingTree (top S, rank Prefix, rank Postfix, Table
Bijection)
Begin
SizeOffspringSubTrees = 0:
If S is a leaf then {
    Bijection[Prefix] = Postfix]
    Return 1;
)
Otherwise, for all offspring s of S,   Carry out {
    SubTreesSize = EncodingTree (s,
                                  Prefix + 1,
                                  Postfix + Size OffspringSubTrees,
                                  Bijection);
    Prefix + = SubTreeSize;
    OffspringSubTreesSize+ = SubTreeSize;
    Bijection[Prefix] = Postfix+OffspringSubTreeSize;
Return OffspringSubTreesSize+1;
End.
```

Be it noted that in the above program the SubTreeSize variable is the size of the Subtree issuing from the instantaneous offspring node (s) and that the variable OffspringSubTreesSize is the cumulative value of the sizes of the subtrees issuing from the already analyzed offspring nodes.

The TreeEncoding function directly creates a computerized data array in the form of an index Table of the kind shown in FIG. 3B and stored in memory. Once this computerized data array has been created, the initial pointer array, now no longer needed, will be eliminated.

Below, and for the sake of simplification, the discussion shall cover a dictionary organized as a lexical tree, each dictionary entry corresponding to one leaf of the tree. As shown above, a computerized data array in the form of a Table having the same size as the tree can be attained by the encoding method of the present invention.

This computerized data array shall be advantageously used to search, on the basis of a chain of given characters, for the corresponding dictionary input. The index is taken in conventional manner as the leaf's prefix rank (alternatively its inverse prefix rank might also be selected). The index search resorts to a first method of the present invention for traversing the tree from its root toward the leaves.

Vice-versa this computerized data array is advantageously used to generate the chain of corresponding characters based on a dictionary input's index. The generation of the chain of characters resorts to a second method of the present invention to traverse the tree from the root toward the leaves.

First the case of the index search for a character chain C will be considered. The tree is traversed from the root along the arcs of which the tags bear the consecutive characters of C.

Advantageously the first method of the present invention for traversing the tree from the root toward the leaves operates in the following manner:

When arriving at the first offspring $s_0$ of a node S, initialization is as follows:

$$\text{Prefix}(s_0)\text{Rank}=\text{Prefix}(S)\text{Rank}+1$$

and the size $\Gamma(s_2)$ issuing from $s_0$ is calculated based on $$\Gamma(s_0)=\text{Postfix}(s_2)\text{Rank}-\text{LastPostfix}$$

where LastPostfix is the postfix rank of the last node of which the subtree traversal was dropped (in other words, the postfix rank of the root of the last lopped Subtree during traversal). Illustratively, if the node having the postfix rank 5 in FIG. 3A were not retained because the arc linking the root and this node does not bear the searched for character, the subtree issuing from this node will not be traversed and LastPostfix=5. Traversal then continues through the node having a postfix rank 19, and, if successful, through that of postfix rank 12. The size of the subtree issuing from this node (first offspring $s_2$ of the node S of postfix rank 19) is effectively 7.

Next the prefix ranks of the consecutive offsprings $s_i$ of S are determined using the following recursion relations:

$$\text{Prefix}(s_{i+1})\text{Rank}=\text{Prefix}(s_i)+\Gamma(s_i)$$

$$\Gamma(s_{i+1})=\text{Postfix}(s_{i+1})\text{Rank}-\text{Postfix}(s_i)\text{Rank}.$$

For each analyzed offspring $s_i$, a test is performed whether the character in progress c of C equals the character exhibited by the tag of the arc joining S to $s_i$. If not, analyzing continues with the following offspring $s_{i+1}$ and so on until a character in progress has been found or until all S offsprings have been analyzed.

When arriving at a given node S, it is not known beforehand how many its offspring are. To attain this objective, advantageously the size $\Gamma(S')$ of the Subtree issuing from said node shall be stored. Next, when exploring the offspring $s_i$ consecutively, the variable OffspringSubTreesSize shall be updated:

$$\sum_{j=0}^{i}\Gamma(s_j)$$

OffspringSubTreesSize=.

Moreover it will be known that all offspring $s_i$ of S shall have been analyzed when $$\text{OffspringSubTreesSize}=\Gamma(S)-1.$$

If all offspring were analyzed without the character in progress having been found, the complete character chain C does not correspond to a dictionary input (however a portion of C may be included). If the character in progress is found for one of the offspring $s_i$, then $S=s_i$, and the search cycle starts over with the next character. This procedure is iterated until a tree leaf has been reached. The searched-for procedure is the prefix rank of this leaf. Advantageously, in order to be able to search for words which are prefixes of each other, for instance "bar" and "barrister" in FIG. 1, one may add, at the end of each mot, a marker of end of word, for instance a space character. In this case all the leaves of the tree bear end-of-word markers.

In this manner a TreeTraversal function may be defined that based on a chain of characters, namely AnalyzeWord, returns the prefix rank of the leaf reached at the end of traversal. This function makes use of the computerized tree data array of the invention. Its pseudo-code C is stated below:

```
Function PrefixIndex TreeTraversal (AnalyzeWord chain , Bijection
Table)
Begin
    S = Root;
Prefix(S) = 0; // root prefix index
SubTree(S)Size = Bijection[Prefix(S)] + 1;
LastPostfix = -1;
As long as SubTree(S) other than 1 {
    s = eldest son of S;
    Prefix(s) = Prefix(S) + 1;
    OffspringSubTreesSize = 0;
        As long as OffspringSubTreesSize < SubTree(S)Size - 1;
            If CharacterInProgress corresponds to tag S toward s
            Then direct traversal toward offspring s by setting S = s;
            Otherwise   {s_2 = following S offspring;
                        Postfix(s) =- Bijection[Prefix(s)];
                        SubTree(s)Size = Postfix(s) - LastPostfix;
```

-continued

```
            Prefix(s₂) = Prefix(s) + SubTree(s)Size;
            LastPostfix = Postfix(s);
            OffspringSubTreesSize + = SubTree(s)Size;
            analyze the next offspring by setting
            s-s₂
            }
        Return IncompleteTraversalCode
        }
Return Prefix(s);
```

Vice-versa, if it is desired to generate the chain of characters of the corresponding dictionary input starting with an index I (assumed equal to the prefix rank of a tree leaf), a second traversal method of the present invention shall be used. Said second method differs from the first in that the selection of the offspring node henceforth is determined by comparing this node's prefix rank to the searched-for index I. More specifically, the offspring $s_i$ is selected as soon as the relation below has been confirmed:

$Prefix(s_{i+1})Rank>I$

The approach to the index I is by increasing prefix rank values of the analyzed nodes.

The second method resorts to the same interacting calculation of the prefix ranks of the offspring of a given node S starting from the respective sizes of the subtrees $\Gamma(s_1)$. The criterion to stop analyzing the offspring $s_i$ of a given node S also is based on comparing $\Gamma S)$ and the sum of $\Gamma(s_i)$ of the offspring already analyzed.

One may define a function GenerateWord which, starting form an index PrefixGuide returns the corresponding chain of characters. This function also uses the computerized data array of the tree of the invention. Its pseudo-code in C is shown below:

```
Function GenerateWord chain (PrefixGuide index, Bijection Table)
Begin
    S= root;
    Prefix(S)= 0; // root prefix index
    SubTree(S)size = Bijection[Prefix(S) + 1,
    LastPostfix = -1;
    As long as SubTree(S)Size is different from 1 {
        s = eldest son of S;
        Prefix(s) = Prefix(S) + 1;
        OffspringSubTreesSize = 0;
        As long as OffspringSubtreesSize < Subtrees(S)Size - 1 {
            s₂ = offspring following S;
            Prefix(s) = Bijection[Prefix(s)];
            Subtree(s)Size = Postfix(s) - LastPostfix;
            Prefix(s₂) = Prefix(s) + Subtree(s)Size;
            If PrefixGuide < Prefix(s₂) ;
            Then {
                Select the path toward the preceding offspring s by setting
                S = s;
                update GeneratedChain
            }
            Otherwise {
                Last Postfix = Postfix(s);
                OffspringSubtreesSize + = Subtree(s)Size;
                analyze the following descendant by setting
                s = s₂
            }
        }
        Return IncompleteTraversalCode
    }
Return GeneratedChain;
```

The invention claimed is:

1. A method comprising:

constructing a table representing a directed tree of data entries in a set of data, each data entry of said set being associated with a particular node of said tree, wherein constructing comprises:

assigning, in a processor arrangement, a first index to each node of said tree, the first index representing the node rank according to a first bijective order relation ordering all the nodes of the tree according to a combination of (a) a descending order relation ordering a node relative to its descendants and (b) a primogeniture order relation of the nodes which are the offspring of one of said nodes;

assigning, in the processor arrangement, a second index to each node of said tree, the second index representing a node rank according to a second bijective order relation ordering all the nodes of the tree according to a combination of (a) the inverse order relation of said descending order relation and (b) said primogeniture order relation, wherein a given node s2 of the directed tree depends on another node s1 of the directed tree if and only if the node rank of s2 according to the first order relation is greater than the node rank of s1 according to the first order relation and the node rank of s2 according to the second order relation is less than the node rank of s1 according to the second order relation and; and storing, in the table with the processor arrangement, values representing the first index of nodes in the tree at addresses representing the second index of nodes in the tree.

2. The method of claim 1, further including determining, in the processor arrangement, the size of a node subtree of an arbitrary tree node by performing a recursive calculation.

3. The method of claim 2, wherein the tree includes a parent node from which first offspring and second offspring descend, said first and second offspring being adjacent in a list of offspring ordered according to the primogeniture order and stored in the processor arrangement, the recursive calculation determining (a) the first index of the second offspring starting from the first index of the first offspring and the size of the subtree derived from the first offspring, and (b) the second index of the second offspring starting from the second index of the first offspring and the size of the subtree derived from the second offspring.

4. The method of claim 3, wherein the recursive calculation stage determines the first index of the offspring classified as being first in a list starting from the first index of said parent node and the second index of said parent node starting from the second index of the offspring classified as being last in said list.

5. The method of claim 2, further including determining, in the processor arrangement, the size of the subtree derived from said parent node starting from the sum of the sizes of the subtrees derived from the offspring of the parent by performing said recursive calculation.

6. The method of claim 1, further including causing the processor arrangement to use pointers on a first tree data array so that for a given node, the processor arrangement derives (a) a first kind of pointer that in turn derives a first offspring node of the given node according to the descending order relation and (b) a second kind of pointer that in turn derives the list of a second offspring node of the given node.

* * * * *

UNITED STATES PATENT AND TRADEMARK OFFICE
CERTIFICATE OF CORRECTION

| | | |
|---|---|---|
| PATENT NO. | : 7,882,109 B2 | Page 1 of 1 |
| APPLICATION NO. | : 10/505483 | |
| DATED | : February 1, 2011 | |
| INVENTOR(S) | : Edmond Lassalle | |

It is certified that error appears in the above-identified patent and that said Letters Patent is hereby corrected as shown below:

In the Claims

Column 14, Claim 1:

At line 25, delete "relation and; and" and insert -- relation; and --

Signed and Sealed this
Twenty-third Day of June, 2015

Michelle K. Lee
*Director of the United States Patent and Trademark Office*